J. A. WORKMAN, Sr.
RESILIENT WHEEL.
APPLICATION FILED APR. 26, 1917.
1,261,087.
Patented Apr. 2, 1918.
2 SHEETS—SHEET 1.
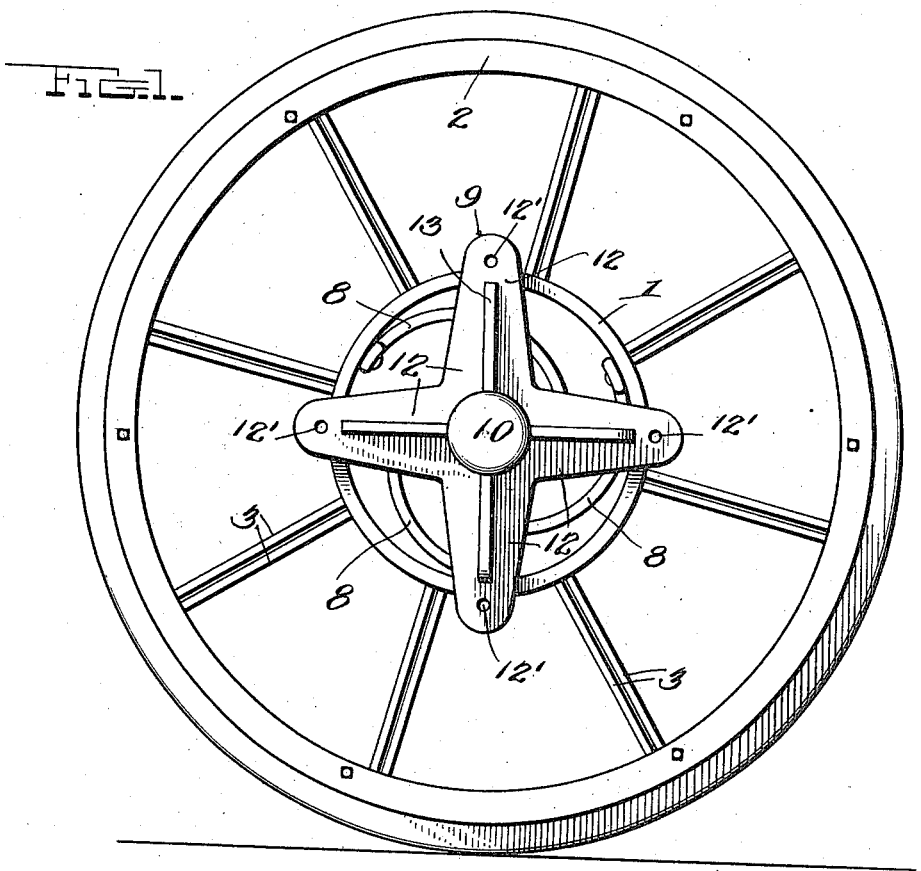
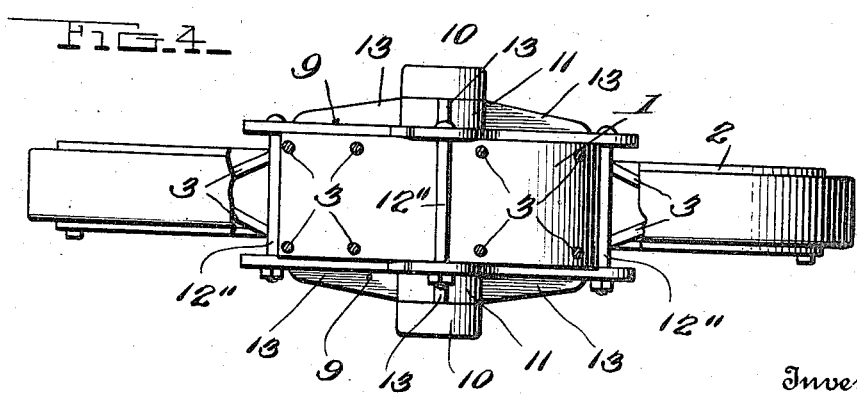
Witness
J. R. Pine
Inventor
J. A. Workman Sr.
By H. B. Wilson &co.
Attorneys

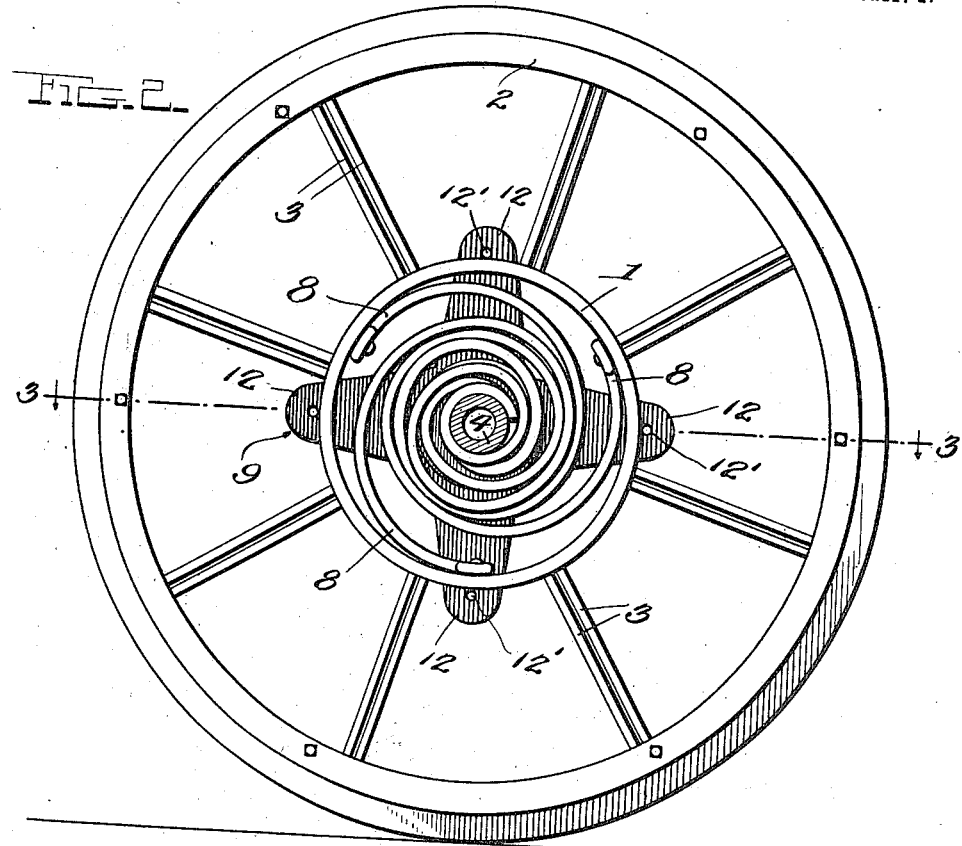
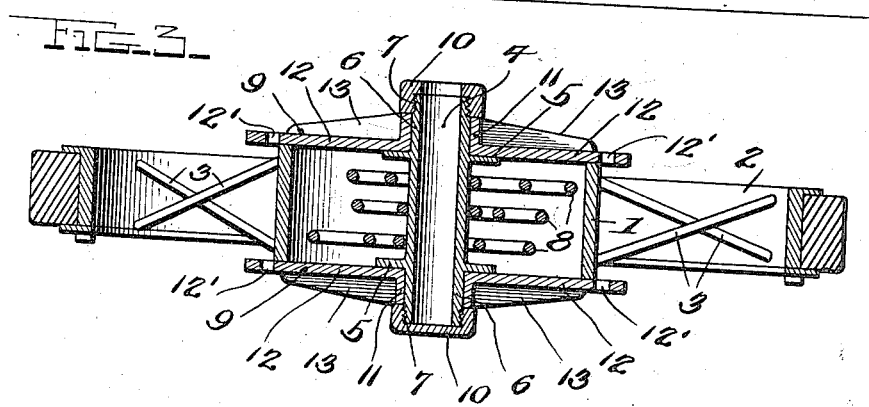

UNITED STATES PATENT OFFICE.

JAMES A. WORKMAN, SR., OF PORTAGEVILLE, MISSOURI.

RESILIENT WHEEL.

1,261,087. Specification of Letters Patent. Patented Apr. 2, 1918.

Application filed April 26, 1917. Serial No. 164,685.

*To all whom it may concern:*

Be it known that I, JAMES A. WORKMAN, Sr., a citizen of the United States, residing at Portageville, in the county of New Madrid and State of Missouri, have invented certain new and useful Improvements in Resilient Wheels; and I do declare the following to be a full, clear, and exact description of the invention, such as will enable others skilled in the art to which it appertains to make and use the same.

My invention relates to vehicle wheels and more particularly to resilient wheels, and it is one object to provide a resilient wheel in which spring means are interposed between the hub and the wheel itself to provide a most efficient and durable construction and with which all lateral displacement of the spring means is absolutely prevented.

Another object of my invention is to provide a resilient wheel of this character in which means are provided to rigidly hold the hub centered in the wheel should the spring means become broken or in any way deranged.

With these and other general objects in view which will appear from the description, my invention resides in the novel features of construction, and the combination and arrangement of parts to be hereinafter fully described and claimed and taken in connection with the accompanying drawings which form part of this application, and in which:—

Figure 1 is a side elevation of the wheel equipped in accordance with my invention;

Fig. 2 is a similar view with the plate removed from the side of the wheel;

Fig. 3 is a horizontal sectional view on the line 3—3 of Fig. 2;

Fig. 4 is a plan view illustrating the detail of the fastening bolts applied between the end plates of the wheel, parts being broken away to show the spoke arrangement.

Briefly described, my invention comprises substantially a wheel member constructed of outer and inner rims suitably connected and provided with a hub disposed for free movement within the inner rim. Arranged between the hub and the inner rim are series of spring members, and carried on the outer ends of the hub are a pair of side plates to prevent lateral displacement of the spring members and which are provided with means to receive connecting bolts therethrough, which bolts when applied will be disposed in engagement with the periphery of the inner rim and thereby hold the hub rigidly centered within the inner rim.

Referring more particularly to the drawings, and describing my invention in detail, I have shown my invention as applied to a wheel of the ordinary type constructed of inner and outer rim members 1 and 2 respectively, which are preferably connected by crossed spoke members 3 in order to insure a rigidity of construction.

Disposed for free movement within the inner rim is a wheel hub 4 provided adjacent its ends with shoulders 5. When in position within the inner rim, the shoulders of the hub will be in alinement with the side edges of the inner rim, as clearly illustrated in Fig. 3, and the ends 6 of the hub extend beyond the edges of the inner rim and are preferably threaded as at 7 to receive thereover the fastening members as will be hereinafter described. To insure resiliency for the wheel, I preferably provide between the hub and the surface of the inner rim a series of coil springs 8 surrounding the hub and anchored with their inner ends in the hub and their outer ends anchored in the surface of the inner rim. I have found it preferable to employ three or four of these coil spring members but any requisite number may be used, the number being entirely dependent upon the existing individual conditions under which the wheel will be called upon to operate. These coil springs 8 are all extended in the same direction and are secured between the inner rim and the hub, with their ends in spaced relation so as to provide an evenly distributed resilient surface on the inner rim.

The principal objectionable feature of all spring wheels of this type has been in the continued lateral displacement of the springs, and to provide a means for preventing this lateral displacement and insuring the most efficient action of the wheel, I provide a pair of end plates 9 to be received over the projecting end portion 6 of the hub as illustrated in Fig. 3, and adapted to abut against the shoulders 5 and be secured thereon by means of a cap 10 threaded over the outer ends of the hub. This manner of fastening, however, I do not limit myself to, as it is obvious that the plates 9 may themselves be threaded on the extensions of the hub or are secured thereto in any other suitable manner as desired.

In detail, the plates 9 comprise a central annular portion 11 apertured to be received over the adjacent end of the hub and having extending therefrom at diametrically opposite points a pair of right angularly disposed crossed arms 12. Owing to the arrangement of the plates on the hub, the arms 12 will be brought into sliding engagement with the edges of the inner rim, and the ends of these arms project slightly beyond the periphery of the inner rim and are provided with apertures 12' therethrough to receive connecting bolts 12'' extending between the arms at opposite sides of the inner rim so as to dispose the bolts in rigid supporting engagement with the outer surface or periphery of the inner rim. Normally, in the operation of this wheel, these bolts are not connected between the side plates and free motion of the hub within the inner rim is provided, and lateral displacement of the spring is prevented by the action of the side plates sliding on the edges of the inner rim. In the event that the spring should become broken the connecting bolts may be positioned in the apertures and secured between the plates, whereby the hub will be held supported and centered within the inner rim which will eliminate any loose bumping action of the hub within the inner rim.

As a means of strengthening the side plates, they are formed with web members 13 extending laterally from the faces of the arms and widened at their inner ends, which are engaged with the central annular member 11. However, I do not limit myself to this detail of construction as it is obvious that these plates may be constructed in any desired form or configuration to produce the same result.

I desire it to be understood that any such changes may be made in the arrangement of the component parts of my wheel and in the details of its construction as will retain the principal features and principles of construction without in any way departing from the spirit of the invention as defined within the scope of the appended claim, and I desire it to be also understood that I do not limit myself specifically to the materials employed in the construction of the wheel or the details of the same, but that any such may be used as will be consistent with the invention as defined in the following claim.

I claim:—

In a wheel, the combination of a hub, an inner rim surrounding and spaced from said hub, spring means between said hub and rim and secured to both, an outer rim surrounding said inner rim and connected thereto by spokes, and a pair of end plates secured at their centers to said hub and receiving said inner rim slidably therebetween, said plates extending beyond the periphery of said inner rim and having bolt holes flush with said periphery, whereby bolts may be passed through said holes in circumferentially slidable contact with the periphery of said inner rim, in case a comparatively rigid structure is necessary.

In testimony whereof I have hereunto set my hand in the presence of two subscribing witnesses.

JAMES A. WORKMAN, Sr.

Witnesses:
H. E. STONE,
R. D. ELLINGTON.

Copies of this patent may be obtained for five cents each, by addressing the "Commissioner of Patents, Washington, D. C."